United States Patent [19]

Beppu

[11] Patent Number: 6,158,248
[45] Date of Patent: Dec. 12, 2000

[54] FUSED-CAST-ALUMINA-ZIRCONIA-SILICA REFRACTORY, METHODS OF MAKING IT AND GLASS MELTING FURNACE EMPLOYING IT

[75] Inventor: Yoshihisa Beppu, Yokohama, Japan

[73] Assignee: Asahi Glass Company Ltd., Tokyo, Japan

[21] Appl. No.: 09/256,215

[22] Filed: Feb. 24, 1999

[30] Foreign Application Priority Data

Feb. 26, 1998 [JP] Japan ................................... 10-045817
Mar. 30, 1998 [JP] Japan ................................... 10-084416

[51] Int. Cl.$^7$ ....................................................... C03B 5/43
[52] U.S. Cl. ........................ 65/374.13; 264/636; 501/17; 501/32; 501/77; 501/79; 501/105
[58] Field of Search ................................ 501/17, 32, 77, 501/79, 105; 65/374.13, 33.1, 33.7; 264/636

[56] References Cited

U.S. PATENT DOCUMENTS

| | | | |
|---|---|---|---|
| 4,053,321 | 10/1977 | Okumiya et al. | 106/57 |
| 4,119,472 | 10/1978 | Brashear, Jr. et al. | 106/57 |
| 4,326,040 | 4/1982 | Kaji et al. | 501/100 |
| 4,992,396 | 2/1991 | McGarry et al. | 501/107 |
| 5,466,643 | 11/1995 | Ishino et al. | 501/105 |

FOREIGN PATENT DOCUMENTS

| | | |
|---|---|---|
| 278766 | 6/1994 | Czech Rep. . |
| 1 205 438 | 11/1965 | Germany . |
| 26 44 239 | 4/1977 | Germany . |
| 2738974 | 3/1978 | Germany . |
| 56-14060 | 2/1981 | Japan . |
| 58-125660 | 7/1983 | Japan . |
| 10-101439 | 4/1998 | Japan . |
| 835995 | 6/1981 | U.S.S.R. . |

*Primary Examiner*—Sean Vincent
*Attorney, Agent, or Firm*—Oblon, Spivak, McClelland, Maier & Neustadt, P.C.

[57] ABSTRACT

A fused-cast-alumina-zirconia-silica refractory consisting essentially of corundum crystals, baddeleyite crystals and a matrix glass phase and having a chemical composition comprising (a) from 30 to 70 wt % of $Al_2O_3$, (b) from 20 to 59 wt % of $ZrO_2$, (c) from 5 to 12 wt % of $SiO_2$, (d) from 0.15 to 0.60 wt % of $Na_2O$, (e) from 0 to 0.50 wt % of $K_2O$, (f) from 0 to 0.40 wt % of $Li_2O$, (g) from 0.05 to 0.80 wt % of $B_2O_3$, (h) from 0.05 to 0.80 wt % of $P_2O_5$, and (i) from 0.05 to 0.50 wt % in total of at least one member selected from the group consisting of $SnO_2$, ZnO, CuO and $MnO_2$.

31 Claims, No Drawings

FUSED-CAST-ALUMINA-ZIRCONIA-SILICA REFRACTORY, METHODS OF MAKING IT AND GLASS MELTING FURNACE EMPLOYING IT

The present invention relates to a fused-cast-alumina-zirconia-silica refractory (hereinafter referred to simply as a fused refractory) which is useful primarily for a portion contacting molten glass or an super(upper)structural portion of a glass melting furnace, whereby exudation of matrix glass at a high temperature is little, and a glass melting furnace employing it.

A fused refractory is prepared in such a manner that a mixed material for a refractory formulated to have a predetermined chemical composition is melted, for example, in an arc electric furnace having electrodes made of graphite, and the obtained melt is cast into a casting mold having predetermined internal dimensions, preliminarily embedded in a heat insulating material, followed by cooling to room temperature for solidification. A refractory made of an ingot thus obtained, has a dense crystal structure. Accordingly, it is a refractory with highly resistant to corrosion by molten glass, as compared with a usual bonded refractory.

The fused cast refractory obtainable by the present invention will be hereinafter described as a fused refractory, since it is prepared usually by casting a refractory material melt in an electric furnace, into a desired shape, as mentioned above. However, a product solidified in the furnace after melting, or one formed into aggregates for a bonded or burned refractory, by pulverizing it, are also useful.

For a glass melting furnace, a refractory containing a relatively large amount of $ZrO_2$ is preferably used among fused cast refractories, particularly for a reason that it is excellent in corrosion resistance. $ZrO_2$ undergoes irreversible expansion or shrinkage due to a phase transition between a monoclinic phase and a tetragonal phase within a temperature range of from about 900° C. to about 1,200° C. However, a refractory having a structure such that a matrix glass surrounds $ZrO_2$ particles thereby to reduce the expansion or shrinkage of $ZrO_2$ within the above temperature range, has been known. Typical example of such a refractory are a fused-cast-alumina-zirconia-silica refractory containing from 33 to 41 wt % of $ZrO_2$ and a high zirconia content fused refractory containing from 80 to 95 wt % of $ZrO_2$.

The fused-cast-alumina-zirconia-silica refractory is most commonly employed, but has a problem such that the matrix glass phase surrounding the crystal phases of corundum, baddeleyite and their eutectic crystal, hs likely to exude under a high temperature condition. Such exudation of matrix glass causes glass defects, such as glass knots or cords directly, and stones or blisters indirectly.

On the other hand, the high zirconia content fused refractory has a less probability of leading to such glass defects, since it has a small amount of a matrix glass phase surrounding the baddeleyite crystal phase, and in recent years, it has been employed especially for melting high quality glass. However, it is expensive as its $ZrO_2$ content is very high.

The causes for exudation of the matrix glass in the fused-cast-alumina-zirconia-silica refractory, are complex. However, a decrease in the viscosity of the matrix glass and extrusion of the matrix glass by a gas evolved from the refractory may, for example, be mentioned. In the matrix glass, a large amount of a glass network modifier component such as $Na_2O$ is contained, whereby the viscosity of the matrix glass is relatively low, and the matrix glass or its reaction product tends to move out of the volume of the refractory along with the evolution of the gas or the like.

On the other hand, for example, carbon and carbide which enters into a melt from graphite electrodes during melting of the refractory material, will be oxidized at a high temperature to form a gas such as carbon dioxide or carbon monoxide, and this gas will extrude the matrix glass.

Accordingly, in order to reduce exudation of the matrix glass, it is necessary to suppress the decrease in the viscosity of the matrix glass, to reduce contamination of a substance causing such gas generation as far as possible, and to bring the ingot to an oxidized state as far as possible.

In order to increase the viscosity of the matrix glass, it is conceivable to reduce the amount of the glass network modifier such as $Na_2O$ in the matrix glass, or in an extreme case, to bring the composition close to a silica glass composition. However, in such a case, mullite is likely to form during cooling of the melt for solidification, whereby cracks tend to form in the ingot, and it is not possible to obtain an ingot having a size and shape acceptable for practical use.

Further, JP-B-42-15603 proposes a method whereby an ingot free from cracks can be obtained, and the matrix glass can be maintained to have a high viscosity at a high temperature. In this method, the matrix glass contains $P_2O_5$ and/or $V_2O_5$ in addition to $SiO_2$, as its components, and further one containing $B_2O_3$ or $R_2O$ (R: Li, Na or K) in addition thereto, is employed.

However, in a case where the $R_2O$ content is eat most 0.6 wt %, at least one of $P_2O_5$ and $B_2O_3$ is contained in a large amount, and their total amount is described to be at least 2.1 wt %. With such a matrix glass composition, it is impossible to maintain the viscosity of the matrix glass at a high level at a high temperature. On the other hand, if the $P_2O_5$ content and the $B_2O_3$ content are low, the $R_2O$ content becomes high, and like the above, it is impossible to maintain the viscosity of the matrix glass at a high level. Further, if $V_2O_5$ enters into molten glass, the molten glass tends to be colored and will not be free from a safety problem, whereby it tends to be undesirable to use such molten glass.

Further, it has been common to lance oxygen into the melt immediately before casting in order to bring the ingot into an oxidized state. However, by such treatment only, it is not possible to sufficiently reduce exudation of the matrix glass.

Further, the following methods for producing refractories have been proposed. A method wherein the starting material is made into fine particles to increase the specific surface area thereby to increase the degree of oxidation, and an oxidizing gas is adsorbed thereon (JP-B-5-8143), a method wherein an oxidizing agent showing an oxidizing action at a low temperature, is added to the starting material (JP-B-5-30793), a method wherein the content of impurities such as oxides of Fe and oxides of Ti in the starting material, is reduced (JP-B-4-26928), and a method wherein the content of not only such impurities but also other impurities (such as oxides of Cr or Cu) is reduced (JP-B-5-7350).

The former two i.e. the method of adsorbing an oxidizing gas and the method of adding an oxidizing agent, have drawbacks that the oxidizing gas or the oxidizing agent to be used undergoes dissociation or decomposition at a temperature far lower than the fusing temperature of the refractory material and does not exhibit a constant oxidizing action continuously in the fused material. The latter two methods for suppressing the content of impurities have drawbacks that contamination of carbon, etc., can not be reduced, so that exudation of the matrix glass can not adequately be reduced, and purification of the starting material to a high level directly leads to an increase of the cost, such being undesirable.

As mentioned above, various proposals have been made on a problem to reduce exudation of the matrix glass, but so far there has been no fused-cast-alumina-zirconia-silica refractory developed which has completely solved the problem. Accordingly, there has been no solu-ion which sufficiently reduces glass-defects such as knots, cords, blisters, stones or coloring in the molten glass.

It is a primary purpose of the present invention to provide a fused-cast-alumina-zirconia-silica refractory whereby exudation of the matrix glass is little, and formation of glass defects in molten glass is reduced.

The present invention provides a fused-cast-alumina-zirconia-silica refractory which is a refractory made of an ingot free from cracks, whereby exudation of the matrix glass is reduced, and formation of glass defects in molten glass is reduced, by maintaining the viscosity of the matrix glass at a relatively high level even at a high temperature, and a glass melting furnace employing it.

The fused-cast-alumina-zirconia-silica refractory of the present invention is a fused-cast-alumina-zirconia-silica refractory consisting essentially of corundum crystals, baddeleyite crystals and a matrix glass phase and having a chemical composition comprising (a) from 30 to 70 wt % of $Al_2O_3$, (b) from 20 to 59 wt % of $ZrO_2$, (c) from 5 to 12 wt % of $SiO_2$, (d) from 0.15 to 0.60 wt % of $Na_2O$, (e) from 0 to 0.50 wt % of $K_2O$, (f) from 0 to 0.40 wt % of $Li_2O$, (g) from 0.05 to 0.80 wt % of $B_2O_3$, (h) from 0.05 to 0.80 wt % of $P_2O_5$, and (i) from 0.05 to 0.50 wt % in total of at least one member selected from the group consisting of $SnO_2$, $ZnO$, $CuO$ and $MnO_2$.

In one of preferred embodiments of the refractory of the present invention, the $SiO_2$ content is from 7 to 10 wt %, and the weight ratio of $SiO_2/(Na_2O+0.66K_2O)$ is from 20 to 30. In another preferred embodiment of the refractory of the present invention, the $SiO_2$ content is from 7 to 10 wt %, and the weight ratio of $SiO_2/(Na_2O+0.66K_2O+2.1Li_2O)$ is from 20 to 30.

In a still further preferred embodiment of the refractory of the present invention, the total of the $B_2O_3$ content and the $P_2O_5$ content is from 0.30 to 0.80 wt %, and the weight ratio of $P_2O_5/B_2O_3$ is from 0.3 to 1.0.

Now, the reasons for the prescribed contents of the respective components will be described.

$Al_2O_3$ is an important component like $ZrO_2$. $Al_2O_3$ constitutes corundum crystals. The corundum crystals exhibit strong corrosion resistance and have a characteristic that they show no abnormal expansion or shrinkage due to a temperature change. However, if the content of $Al_2O_3$ exceeds 70 wt %, mullite is likely to form, whereby it tends to be difficult to obtain an ingot free from cracks. On the other hand, if the content of $Al_2O_3$ is smaller than 30 wt %, the content of $ZrO_2$ tends to be relatively high, whereby it also tends to be difficult to obtain an ingot free from cracks.

$ZrO_2$ is preferably contained in a large amount with a view to improving the corrosion resistance. However, if its content exceeds 59 wt %, within the after-mentioned range of the amount of matrix glass, expansion and shrinkage due to a phase transition of $ZrO_2$ will not be reduced, whereby it tends to be difficult to obtain an ingot free from cracks. On the other hand, if the content of $ZrO_2$ is less than 20 wt %, the corrosion resistance tends to be remarkably low.

$SiO_2$ is the main component for forming the network of the matrix glass, and its content is from 5 to 12 wt %. If it is less than 5 wt %, the absolute amount of the matrix glass tends to be small, whereby it tends to be difficult to obtain an ingot free from cracks, or even if such an ingot can be obtained, it will not exhibit a good structure. On the other hand, if it exceeds 12 wt %, mullite is likely to form, and the absolute amount of exudation of the matrix glass tends to increase.

$Na_2O$ constitutes a structure for modifying the network of the matrix glass and exhibits an action to control the viscosity of the matrix glass and an action to inhibit formation of mullite. The content of $Na_2O$ is from 0.15 to 0.60 wt %. If it exceeds 0.6 wt %, the superiority in the non-exudation characteristic of matrix glass to the conventional fused-cast-alumina-zirconia-silica refractory, can not be obtained. On the other hand, if it is less than 0.15 wt %, formation of mullite is accelerated, whereby it tends to be difficult to obtain an ingot free from cracks.

$K_2O$ is not an essential component, but shows the same action as $Na_2O$, and it is preferably contained within a range of from 0 to 0.50 wt %.

$Li_2O$ is not an essential component, but exhibits the same action as $Na_2O$ and further has an action to reduce the thermal expansion coefficient of the matrix glass phase. Accordingly, it is preferably contained within a range of from 0 to 0.50 wt %.

$Na_2O$, $K_2O$ and $Li_2O$ exhibit similar actions. However, it is preferred to use $Na_2O$ and $K_2O$ and/or $Li_2O$ in combination rather than using $Na_2O$ alone, with a view to broadening the vitrification range of the matrix glass and suppressing formation of mullite.

However, if the total amount of $Na_2O$, $K_2O$ and $Li_2O$ is too much, the viscosity of the matrix glass tends to decrease. Accordingly, their total amount is preferably less than 0.6 wt %.

Usual matrix glass is composed of sodium aluminosilicate, and $B_2O_3$ and $P_2O_5$ serve alone or in combination to broaden the vitrification range of the matrix glass. Namely, $B_2O_3$ and $P_2O_5$ play a role of vitrifying even within a compositional range having a lower $Na_2O$ content and further exhibit an action to maintain a proper viscosity at a high temperature. Such actions can hardly be obtainable if $B_2O_3$ and $P_2O_5$ are, respectively, less than 0.05 wt %. On the other hand, if they exceed 0.6 wt %, respectively, the viscosity of the matrix glass tends to be low, and exudation of the matrix glass increases.

$SnO_2$, $ZnO$, $CuO$ and $MnO_2$ are components effective to prevent formation of cracks in the refractory made of an ingot and for densification of the structure. In the present invention, the total amount of at least one member selected from the group consisting of $SnO_2$, $ZnO$, $CuO$ and $MnO_2$ is usually from 0.05 to 0.50 wt %, preferably from 0.15 to 0.40 wt %.

The matrix glass in the refractory of the present invention contains $B_2O_3$ and $P_2O_5$ in a state where the $Na_2O$ content is less than usual, whereby the charge against $Si^{4+}$ being glass network forming ions, is not necessarily well balanced.

Here, $SnO_2$, $ZnO$, $CuO$ and $MnO_2$ are effective to adjust the balance of the charge for the glass network forming ions and have a less action to reduce the viscosity of the matrix glass, as compared with e.g. $Na_2O$. These components except ZnO act as oxidizing agent at a high temperature, whereby they maintain the redox of melt more oxidative. $SnO_2$ is most preferable. The above actions tend to be hardly obtainable if the total amount of at least one member selected from the group consisting of $ZnO$, $CuO$ and $MnO_2$ is less than 0.05 wt %. On the other hand, if it exceeds 0.50 wt %, the viscosity of the matrix glass tends to be low, and exudation of the matrix glass increases, and further such may cause coloring.

Further, it is preferred that the $SiO_2$ content is from 7 to 10 wt %, and the weight ratio of $SiO_2/(Na_2O+0.66K_2O+$ 2.1Li$_2$O) is from 20 to 30. This ratio may be a weight ratio of SiO$_2$/Na$_2$O in a case where K$_2$O and Li$_2$O are not contained. However, in a case where they are contained, the weight ratio of SiO$_2$/(Na$_2$O+0.66K$_2$O+2.1Li$_2$O) is employed. In the latter case, the action per molecule of Na$_2$O is considered to correspond substantially to the action per molecule of K$_2$O or Li$_2$O, roughly speaking. Accordingly, as a weight calculated from the molecular weight, Na$_2$O=0.66 (=61.98/94.20) K$_2$O, and Na$_2$O=2.1 (61.98/29.88) Li$_2$O. Therefore, as the dominator, (Na$_2$O wt %+0.66K$_2$O wt %+2.1Li$_2$O wt %) is employed.

In such a compositional range, the non-exudation characteristic of the matrix glass will be excellent, and at 1,500° C., there will be no substantial exudation of the matrix glass.

Similarly, it is preferred that the total of the B$_2$O$_3$ content and the P$_2$O$_5$ content is from 0.30 to 0.70, and the weight ratio of P$_2$O$_5$/B$_2$O$_3$ is from 0.3 to 1.0. Within this compositional range, an ingot free from cracks can be constantly obtained, and an excellent non-exudation characteristic of the matrix glass will be obtained.

Further, a fused-cast-alumina-zirconia-silica refractory having such a chemical composition has a crystal structure which consists essentially of corundum crystals, baddeleyite crystals and the matrix glass phase. Depending upon a particular composition, a small amount of other crystals may be contained without any trouble in actual use. With respect to components other than the above-described components, they may be contained in a small amount not to impair the purpose or the effects of the present invention, but they are preferably in an amount as small as possible, particularly preferably less than 1 wt %.

If the above fused-cast-alumina-zirconia-silica refractory is used as a refractory for a glass melting furnace, it is certainly possible to reduce the possibility of formation of glass defects such as knots, stones or blisters, since exudation of the matrix glass is little.

When the fused-cast-alumina-zirconia-silica refractory is used as a refractory for a glass melting furnace, it may be generally classified into one for a portion not contacting molten glass and one for a portion contacting molten glass, depending upon the portion where it is used.

A refractory for a portion not contacting molten glass is a refractory to be used for e.g. a super(upper)structure or crown. Recently, an oxy-fuel combustion system has been introduced, and glass melting has now been carried out in an environment under a severer temperature condition than ever. Under such a condition, it is preferred to employ a refractory having a low ZrO$_2$ content and a relatively high Al$_2$O$_3$ content. It is considered that corundum is thereby structurally strongly maintained against a temperature change, a high temperature product derived from corundum tends to hardly remain in molten glass during cooling, and the volume remaining expansion rate of the obtained refractory will be small.

Accordingly, as a refractory to be used for such a purpose, one having an Al$_2$O$_3$ content of from 50 to 70 wt % and a ZrO$_2$ content of from 20 to 38 wt %, is preferred. If such a refractory is used for a portion not contacting molten glass, such as a super(upper)structure or crown recently, it is possible to certainly reduce the possibility of formation of glass defects such as knots or stones in molten glass.

On the other hand, the refractory for a portion contacting molten glass is, for example, one so-celled sidewall or paving, and it is required to have particularly good corrosion resistance. In order to exhibit high corrosion resistance at the portion contacting molten glass, the ZrO$_2$ content is preferably high. As a refractory used for such a purpose, it is preferred that the ZrO$_2$ content is at a level of from 35 to 59 wt %, and the Al$_2$O$_3$ content is at a level of from 30 to 53 wt %. If such a refractory is used as a refractory for a portion contacting molten glass, such as sidewall or paving, it is possible to certainly reduce the possibility of formation of glass defects such a:, knots or blisters.

Now, the present invention will be described in further detail with reference to Examples. However, it should be understood that the present invention is by no means restricted to such specific Examples.

EXAMPLES

Bayer's process alumina, low alkali alumina or the like as an Al$_2$O$_3$ source, silica-removed zirconia, baddeleyite, zircon or the like, as a ZrO$_2$ source, silica sand or the like, as an SiO$_2$ source, sodium carbonate or the like as a Na$_2$O source, potassium carbonate or the like as a K$_2$O source, boron phosphate, boron oxide, sodium phosphate or the like as a B$_2$O$_3$ source and a P$_2$O$_5$ source, and tin oxide as a SnO$_2$ source, zinc oxide as a ZnO source, copper oxide as a CuO source, and manganese dioxide as a MnO source, were weighed in a predetermined amounts and mixed. The mixture was completely melted at 1,900° C. by a single phase arc electric furnace of 500 kVA having graphite electrodes to obtain a melt. This melt was cast into a sand mold having internal dimensions of 350 mm height×160 mm length×130 mm width, embedded in an silica-alumina hollow ball and cooled to room temperature to obtain an ingot. Firstly, the obtained ingot was cut into two equal halves along about the center of two sides of 160 mm, whereupon presence or absence of cracks was examined, and the structure was inspected. The results (1 to 40) are shown in Tables 1 to 4.

The microstructure was inspected by an optical microscope, whereby it was found that all ingots consist essentially of corundum crystals, baddeleyite crystals and a matrix glass phase.

Then, a sample for determinating the chemical composition was taken from a portion not containing the surface at the bottom of the ingot. The chemical compositions of the respective components were measured by means of the following apparatus.

The ZrO$_2$ content, the SiO$_2$ content, the P$_2$O$_5$ content, the SnO$_2$ content, the ZnO content, the CuO content and the MnO$_2$ content were measured by means of a fluorescent X-ray analyzer. The Na$_2$O content and the K$_2$O content were measured by means of an atomic absorption spectroscopy after decomposing the sample with hydrofluoric acid-sulfuric acid. The B$_2$O$_3$ content was measured by means of an ICP atomic emission spectroscopy after decomposing the sample to alkali decompose fusion. The ingot contains very small amounts of Fe$_2$O$_3$, TiO$_2$, etc., in addition to the above measured components, but the Al$_2$O$_3$ content was calculated by subtracting the above measured components from the total. The results of measurements of the chemical compositions are shown in Tables 1 and 2.

Further, with respect to each obtained ingot, exudation of the matrix glass was measured. The results are shown in Table 1. The exudation of the matrix glass was determined in such a manner that a cubic sample with each side being 30 mm was cut out from a portion not containing the surface portion (i.e. a portion distanced from the side surface by at least 20 mm) in the cross section at a height of from 30 to 100 mm from the bottom surface, and this sample was heated at 1,500° C. and 1,600° C. for 48 hours. The evaluation was made by a percentage of the decrease of the mass by heating, based on the mass before heating.

As Comparative Examples, usual samples not containing $B_2O_3$, $P_2O_5$, $SnO_2$, ZnO, CuO and $MnO_2$, and samples which contain these components in amounts outside the ranges of the composition of the present invention, were prepared and analyzed in the same manner as working Examples of the present invention. The results are shown in Table 5 (41 to 48).

From Tables 1 to 4, it is evident that the products of the present invention exhibit clearly excellent non-exudation characteristics of matrix glass (i.e. exudation of the matrix glass is little, or there is no exudation at 1,500° C.)

With the products of the present invention, it is believed that the matrix glass exhibits a high viscosity at a high temperature mainly as the $Na_2O$ content and/or the $K_2O$ content are reduced in the matrix glass. Usually, in such a case, cracks are likely to form in an ingot during the cooling. Whereas, in the present invention, it is possible to constantly obtain an ingot free from cracks and having a good structure, by the addition of a proper amount of at least one member selected from the group consisting of $B_2O_3$, $P_2O_5$, $SnO_2$, ZnO, CuO and $MnO_2$. Further, the $SiO_2$ i.e. the matrix glass content, can be reduced, whereby it is expected that the absolute amount of exudation of the matrix glass can be reduced.

From the foregoing, it should be understood that when the product of the present invention is used as a furnace material for a glass melting furnace, particularly for a portion contacting molten glass or an super(upper)structural portion, it is possible to reduce a possibility of formation of glass defects such as knots, cords, blisters, stones, etc.

TABLE 1

| Chemical composition | 1 | 2 | 3 | 4 | 5 | 6 | 7 | 8 | 9 | 10 | 11 | 12 |
|---|---|---|---|---|---|---|---|---|---|---|---|---|
| $Al_2O_3$ | 57.3 | 54.4 | 49.2 | 46.1 | 45.9 | 51.5 | 48.3 | 50.8 | 50.4 | 51.5 | 50.2 | 49.6 |
| $ZrO_2$ | 33.5 | 36.1 | 41.0 | 44.2 | 41.4 | 36.7 | 42.2 | 40.5 | 40.8 | 39.5 | 40.9 | 41.3 |
| $SiO_2$ | 8.06 | 8.32 | 8.61 | 8.50 | 11.4 | 10.5 | 8.40 | 7.68 | 7.80 | 8.01 | 8.07 | 8.23 |
| $Na_2O$ | 0.51 | 0.54 | 0.56 | 0.55 | 0.58 | 0.57 | 0.54 | 0.24 | 0.35 | 0.15 | 0.15 | 0.10 |
| $K_2O$[1] | — | — | — | — | — | — | — | 0.18 | 0.11 | 0.25 | — | 0.11 |
| $Li_2O$ | — | — | — | — | — | — | — | — | — | — | 0.10 | 0.08 |
| $B_2O_3$ | 0.11 | 0.10 | 0.10 | 0.10 | 0.18 | 0.13 | 0.09 | 0.11 | 0.15 | 0.18 | 0.17 | 0.18 |
| $P_2O_5$ | 0.10 | 0.10 | 0.09 | 0.10 | 0.08 | 0.11 | 0.08 | 0.10 | 0.11 | 0.12 | 0.11 | 0.11 |
| $SnO_2$ | 0.36 | 0.38 | 0.38 | 0.40 | 0.38 | 0.48 | 0.37 | 0.31 | 0.28 | 0.26 | 0.25 | 0.26 |
| ZnO | 0.00 | 0.00 | 0.00 | 0.00 | 0.00 | 0.00 | 0.00 | 0.00 | 0.00 | 0.00 | 0.00 | 0.00 |
| CuO | 0.00 | 0.00 | 0.00 | 0.00 | 0.00 | 0.00 | 0.00 | 0.00 | 0.00 | 0.00 | 0.00 | 0.00 |
| $MnO_2$ | 0.00 | 0.00 | 0.00 | 0.00 | 0.00 | 0.00 | 0.00 | 0.00 | 0.00 | 0.00 | 0.00 | 0.00 |
| S/N[2] | 15.8 | 15.4 | 15.4 | 15.5 | 19.7 | 18.4 | 15.6 | 21.3 | 18.6 | 25.0 | 22.4 | 24.2 |
| P + B[3] | 0.21 | 0.20 | 0.19 | 0.20 | 0.26 | 0.24 | 0.17 | 0.21 | 0.26 | 0.30 | 0.28 | 0.29 |
| P/B[4] | 0.91 | 1.0 | 0.90 | 1.0 | 0.44 | 0.85 | 0.9 | 0.91 | 0.73 | 0.67 | 0.65 | 0.61 |
| Cracks | Nil | Nil | Nil | Nil | Nil | Nil | Nil | Nil | Nil | Nil | Nil | Nil |
| Structure | Good | Good | Good | Good | Good | Good | Good | Good | Good | Good | Good | Good |
| Exudation: | | | | | | | | | | | | |
| 1,500° C. | 0.73 | 0.70 | 0.68 | 0.65 | 0.62 | 0.24 | 0.23 | 0.25 | 0.40 | 0.10 | 0.15 | 0.08 |
| 1,600° C. | 2.10 | 2.05 | 1.94 | 1.80 | 1.76 | 1.29 | 1.18 | 1.05 | 1.33 | 1.03 | 0.98 | 0.80 |

The units are wt % or w/w ratio.
[1] — indicates that the starting material contained no $K_2O$ component and $Li_2O$ component, and these content was not measured.
[2] S/N represents the weight ratio of $SiO_2/Na_2O$ or the weight ratio of $SiO_2/(Na_2O + 0.66K_2O + 2.1Li_2O)$.
[3] P + B represents the total of the $B_2O_3$ content and the $P_2O_5$ content.
[4] P/B represents the weight ratio of $P_2O_5/B_2O_3$.

TABLE 2

| Chemical composition | 13 | 14 | 15 | 16 | 17 | 18 | 19 | 20 | 21 | 22 |
|---|---|---|---|---|---|---|---|---|---|---|
| $Al_2O_3$ | 52.0 | 51.7 | 50.9 | 47.2 | 50.6 | 48.7 | 61.8 | 33.0 | 52.3 | 49.7 |
| $ZrO_2$ | 40.9 | 38.6 | 39.5 | 43.7 | 40.1 | 41.5 | 28.8 | 57.0 | 38.0 | 40.5 |
| $SiO_2$ | 6.31 | 8.70 | 8.41 | 7.81 | 8.02 | 8.45 | 8.03 | 8.56 | 8.12 | 8.28 |
| $Na_2O$ | 0.30 | 0.37 | 0.29 | 0.22 | 0.16 | 0.30 | 0.30 | 0.32 | 0.43 | 0.43 |
| $K_2O$[1] | — | — | — | — | 0.20 | — | — | — | — | — |
| $Li_2O$ | — | — | — | — | — | — | — | — | — | — |
| $B_2O_3$ | 0.21 | 0.22 | 0.38 | 0.40 | 0.34 | 0.57 | 0.35 | 0.33 | 0.72 | 0.10 |
| $P_2O_5$ | 0.10 | 0.17 | 0.31 | 0.35 | 0.28 | 0.21 | 0.28 | 0.36 | 0.08 | 0.73 |
| $SnO_2$ | 0.10 | 0.22 | 0.19 | 0.25 | 0.24 | 0.19 | 0.39 | 0.35 | 0.26 | 0.26 |
| ZnO | 0.00 | 0.00 | 0.00 | 0.00 | 0.00 | 0.00 | 0.00 | 0.00 | 0.00 | 0.00 |
| CuO | 0.00 | 0.00 | 0.00 | 0.00 | 0.00 | 0.00 | 0.00 | 0.00 | 0.00 | 0.00 |
| $MnO_2$ | 0.00 | 0.00 | 0.00 | 0.00 | 0.00 | 0.00 | 0.00 | 0.00 | 0.00 | 0.00 |
| S/N[2] | 21.0 | 23.5 | 29.0 | 35.5 | 27.7 | 28.2 | 26.8 | 26.8 | 18.9 | 19.3 |
| P + B[3] | 0.31 | 0.39 | 0.69 | 0.75 | 0.62 | 0.78 | 0.63 | 0.69 | 0.80 | 0.83 |
| P/B[4] | 0.48 | 0.77 | 0.82 | 0.88 | 0.82 | 0.37 | 0.80 | 1.1 | 0.11 | 7.3 |

TABLE 2-continued

| Chemical composition | 13 | 14 | 15 | 16 | 17 | 18 | 19 | 20 | 21 | 22 |
|---|---|---|---|---|---|---|---|---|---|---|
| Cracks | Nil | Nil | Nil | Nil | Nil | Nil | Nil | Nil | Nil | Nil |
| Structure | Good | Good | Good | Good | Good | Good | Good | Good | Good | Good |
| Exudation: | | | | | | | | | | |
| 1,500° C. | 0.05 | 0.01 | 0.03 | 0.00 | 0.00 | 0.09 | 0.00 | 0.00 | 0.25 | 0.40 |
| 1,600° C. | 0.30 | 0.49 | 0.63 | 0.81 | 0.53 | 0.89 | 0.50 | 0.62 | 1.52 | 1.80 |

The units are wt % or w/w ratio.
[1] — indicates that the starting material contained no $K_2O$ component and $Li_2O$ component, and these content was not measured.
[2] S/N represents the weight ratio of $SiO_2/Na_2O$ or the weight ratio of $SiO_2/(Na_2O + 0.66K_2O + 2.1Li_2O)$.
[3] P + B represents the total of the $B_2O_3$ content and the $P_2O_5$ content.
[4] P/B represents the weight ratio of $P_2O_5/B_2O_3$.

TABLE 3

| Chemical composition | 23 | 24 | 25 | 26 | 27 | 28 | 29 | 30 |
|---|---|---|---|---|---|---|---|---|
| $Al_2O_3$ | 50.9 | 50.3 | 51.4 | 51.6 | 51.6 | 50.5 | 47.3 | 52.8 |
| $ZrO_2$ | 39.8 | 40.3 | 39.5 | 39.0 | 39.3 | 40.2 | 39.8 | 40.4 |
| $SiO_2$ | 8.12 | 8.05 | 7.95 | 8.10 | 7.98 | 8.01 | 11.2 | 5.90 |
| $Na_2O$ | 0.33 | 0.32 | 0.30 | 0.32 | 0.31 | 0.32 | 0.45 | 0.30 |
| $B_2O_3$ | 0.33 | 0.32 | 0.36 | 0.33 | 0.35 | 0.35 | 0.42 | 0.20 |
| $P_2O_5$ | 0.25 | 0.26 | 0.24 | 0.26 | 0.28 | 0.26 | 0.40 | 0.18 |
| $SnO_2$ | 0.00 | 0.00 | 0.00 | 0.00 | 0.00 | 0.00 | 0.00 | 0.00 |
| ZnO | 0.18 | 0.38 | 0.01 | 0.00 | 0.00 | 0.00 | 0.42 | 0.00 |
| CuO | 0.00 | 0.00 | 0.15 | 0.35 | 0.02 | 0.01 | 0.00 | 0.16 |
| $MnO_2$ | 0.00 | 0.00 | 0.00 | 0.00 | 0.16 | 0.32 | 0.00 | 0.00 |
| S/N | 24.6 | 25.2 | 26.5 | 25.3 | 25.7 | 25.0 | 24.9 | 19.7 |
| Cracks | Nil | Nil | Nil | Nil | Nil | Nil | Nil | Nil |
| Structure | Good | Good | Good | Good | Good | Good | Good | Good |
| Exudation: | | | | | | | | |
| 1,500° C. | 0.02 | 0.03 | 0.11 | 0.15 | 0.13 | 0.21 | 0.41 | 0.15 |
| 1,600° C. | 1.75 | 1.52 | 1.76 | 1.72 | 1.50 | 1.87 | 2.01 | 1.53 |

The units are wt %, provided that S/N represents the weight ratio of $SiO_2/Na_2O$.

TABLE 4

| Chemical composition | 31 | 32 | 33 | 34 | 35 | 36 | 37 | 38 | 39 | 40 |
|---|---|---|---|---|---|---|---|---|---|---|
| $Al_2O_3$ | 49.6 | 52.4 | 50.5 | 51.0 | 50.1 | 57.6 | 62.3 | 36.1 | 50.6 | 48.1 |
| $ZrO_2$ | 40.9 | 38.5 | 40.2 | 39.5 | 40.3 | 33.5 | 27.6 | 54.5 | 40.2 | 42.5 |
| $SiO_2$ | 8.41 | 7.91 | 8.03 | 8.22 | 8.29 | 7.55 | 8.78 | 8.12 | 8.08 | 8.16 |
| $Na_2O$ | 0.20 | 0.37 | 0.29 | 0.27 | 0.15 | 0.43 | 0.30 | 0.30 | 0.13 | 0.11 |
| $K_2O$ | 0.16 | 0.00 | 0.00 | 0.00 | 0.20 | 0.00 | 0.00 | 0.00 | 0.00 | 0.10 |
| $Li_2O$ | 0.00 | 0.00 | 0.00 | 0.00 | 0.00 | 0.00 | 0.00 | 0.00 | 0.11 | 0.07 |
| $B_2O_3$ | 0.21 | 0.25 | 0.26 | 0.39 | 0.34 | 0.42 | 0.43 | 0.33 | 0.35 | 0.33 |
| $P_2O_5$ | 0.20 | 0.29 | 0.29 | 0.32 | 0.28 | 0.26 | 0.28 | 0.36 | 0.25 | 0.28 |
| $SnO_2$ | 0.00 | 0.00 | 0.00 | 0.00 | 0.00 | 0.00 | 0.00 | 0.00 | 0.00 | 0.00 |
| ZnO | 0.25 | 0.12 | 0.15 | 0.10 | 0.11 | 0.22 | 0.21 | 0.21 | 0.24 | 0.26 |
| CuO | 0.00 | 0.16 | 0.01 | 0.10 | 0.10 | 0.01 | 0.01 | 0.00 | 0.00 | 0.00 |
| $MnO_2$ | 0.00 | 0.00 | 0.18 | 0.09 | 0.10 | 0.01 | 0.00 | 0.00 | 0.00 | 0.00 |
| S/N | 27.5 | 21.4 | 27.7 | 30.4 | 29.4 | 17.6 | 29.3 | 27.1 | 22.4 | 25.5 |
| Cracks | Nil | Nil | Nil | Nil | Nil | Nil | Nil | Nil | Nil | Nil |
| Structure | Good | Good | Good | Good | Good | Good | Good | Good | Good | Good |
| Exudation: | | | | | | | | | | |
| 1,500° C. | 0.05 | 0.02 | 0.09 | 0.02 | 0.10 | 0.45 | 0.06 | 0.01 | 0.15 | 0.08 |
| 1,600° C. | 1.40 | 1.72 | 1.33 | 1.21 | 1.45 | 1.85 | 1.20 | 0.85 | 1.32 | 0.91 |

The units are wt %, provided that S/N is the weight ratio of $SiO_2/Na_2O$ or the weight ratio of $SiO_2/(Na_2O + 0.66K_2O + 2.1Li_2O)$.

TABLE 5

| Chemical composition | 41 | 42 | 43 | 44 | 45 | 46 | 47 | 48 |
|---|---|---|---|---|---|---|---|---|
| $Al_2O_3$ | 53.2 | 45.1 | 42.5 | 43.9 | 54.2 | 42.0 | 44.4 | 49.8 |
| $ZrO_2$ | 33.5 | 42.8 | 41.2 | 43.0 | 40.8 | 42.0 | 42.5 | 40.5 |
| $SiO_2$ | 12.1 | 11.0 | 13.0 | 12.5 | 4.50 | 12.5 | 12.5 | 8.50 |
| $Na_2O$ | 1.20 | 1.09 | 1.18 | 0.48 | 0.15 | 1.20 | 0.50 | 0.40 |
| $K_2O$ | — | — | — | — | — | — | — | — |
| $Li_2O$ | — | — | — | — | — | — | — | — |
| $B_2O_3$ | — | — | 0.85 | 0.02 | 0.08 | 0.85 | 0.03 | 0.08 |
| $P_2O_5$ | — | — | 0.83 | 0.02 | 0.07 | 0.83 | 0.02 | 0.07 |
| $SnO_2$ | — | — | 0.35 | 0.03 | 0.15 | — | — | — |
| ZnO | — | — | — | — | — | 0.60 | 0.03 | 0.20 |
| CuO | — | — | — | — | — | 0.00 | 0.00 | 0.24 |
| $MnO_2$ | — | — | — | — | — | 0.00 | 0.00 | 0.21 |
| S/N[1] | 10.1 | 10.1 | 11.0 | 26.0 | 30.0 | 10.2 | 25.0 | 21.3 |
| P + B[2] | — | — | 1.68 | 0.04 | 0.15 | 1.68 | 0.05 | 0.15 |
| P/B[3] | — | — | 0.98 | 1 | 0.9 | 0.98 | 0.67 | 0.88 |
| Cracks | Nil | Nil | Nil | Present | Present | Nil | Present | Nil |
| Structure | Good | Good | Poor | Poor | Poor | Poor | Poor | Poor |
| Exudation: | | | | | | | | |
| 1,500° C. | 1.15 | 0.90 | 2.80 | ND | MD | 3.12 | ND | 1.50 |
| 1,600° C. | 3.15 | 2.81 | 5.62 | ND | ND | 6.03 | ND | 4.20 |

[1]S/N represents the weight ratio of $SiO_2/Na_2O$ or the weight ratio of $SiO_2/(Na_2O + 0.66K_2O + 2.1Li_2O)$.
[2]P + B represents the total of the $B_2O_3$ content and the $P_2O_5$ content.
[3]P/B represents the weight ratio of $P_2O_5/B_2O_3$.
In the table, — means that the starting material contained no such a component, and no such content was measured, and ND means that the structure was so poor that a sample for measurement could not be sampled.

The fused-cast-alumina-zirconia-silica refractory of the present invention is excellent in the non-exudation characteristic of the matrix glass at a high temperature, as compared with conventional refractories. Accordingly, it can suitably be employed not only for a portion not contacting molten glass such as an super(upper)structural portion but also for a portion contacting molten glass such as paving. By the use of the product of the present invention, glass defects of molten glass can be reduced to a large extent, and the industrial value of the product of the present invention is substantial.

What is claimed is:

1. A fused-cast-alumina-zirconia-silica refractory consisting essentially of corundum crystals, baddeleyite crystals and a matrix glass phase and having a chemical composition comprising (a) from 30 to 70 wt % of $Al_2O_3$, (b) from 20 to 59 wt % of $ZrO_2$, (c) from 5 to 12 wt % of $SiO_2$, (d) from 0.15 to 0.60 wt % of $Na_2O$, (e) from 0 to 0.50 wt % of $K_2O$, (f) from 0 to 0.40 wt % of $Li_2O$, (g) from 0.05 to 0.80 wt % of $B_2O_3$, (h) from 0.05 to 0.80 wt % of $P_2O_5$, and (i) from 0.05 to 0.50 wt % in total of at least one member selected from the group consisting of $SnO_2$, ZnO, CuO and $MnO_2$.

2. The refractory according to claim 1, wherein the $SnO_2$ content is from 0.05 to 0.50 wt %.

3. The refractory according to claim 1, wherein a content in total of at least one member selected from the group consisting of ZnO, CuO and $MnO_2$ is from 0.05 to 0.50 wt %.

4. The refractory according to claim 1, wherein the $Si_2O_2$ content is from 7 to 10 wt %, and the weight ratio of $SiO_2/(Na_2O+0.66K_2O+2.1Li_2O)$ is from 20 to 30.

5. The refractory according to claim 1, wherein the total of the $B_2O_3$ content and the $P_2O_5$ content is from 0.30 to 0.80 wt %, and the weight ratio of $P_2O_5/B_2O_3$ is from 0.3 to 1.0.

6. The refractory according to claim 1, wherein the $Al_2O_3$ content is from 50 to 70 wt %, and the $ZrO_2$ content is from 20 to 38 wt %.

7. The refractory according to claim 1, wherein the $ZrO_2$ content is from 35 to 59 wt %, and the $Al_2O_3$ content is from 30 to 53 wt %.

8. A glass melting furnace employing the refractory as defined in claim 1.

9. A glass melting furnace employing the refractory as defined in claim 6 at a portion not contacting molten glass.

10. A glass melting furnace employing the refractory as defined in claim 7 as a refractory for a portion contacting molten glass.

11. A method of making a fused-cast-alumina-zirconia-silica refractory, the method comprising casting a melt including alumina, zirconia and silica; and
forming the fused-cast-alumina-zirconia-silica refractory of claim 1.

12. A fused-cast-alumina-zirconia-silica refractory consisting essentially of corundum crystals, baddeleyite crystals and a matrix glass phase and having a chemical composition comprising (a) from 30 to 70 wt % of $Al_2O_3$, (b) from 20 to 59 wt % of $ZrO_2$, (c) from 5 to 12 wt % of $SiO_2$, (d) from 0.15 to 0.60 wt % of $Na_2O$, (e) from 0 to 0.50 wt % of $K_2O$, (f) from 0.05 to 0.80 wt % of $B_2O_3$, (g) from 0.05 to 0.80 wt % of $P_2O_5$, and (h) from 0.05 to 0.50 wt % in total of at least one member selected from the group consisting of $SnO_2$, ZnO, CuO and $MnO_2$.

13. The refractory according to claim 12, wherein the $SnO_2$ content is from 0.05 to 0.50 wt %.

14. The refractory according to claim 12, wherein a content in total of at least one member selected from the group consisting of ZnO, CuO and $MnO_2$ is from 0.05 to 0.50 wt %.

15. The refractory according to claim 12, wherein the $SiO_2$ content is from 7 to 10 wt %, and the weight ratio of $SiO_2/(Na_2O+0.66 K_2O)$ is from 20 to 30.

16. The refractory according to claim 12, wherein the total of the $B_2O_3$ content and the $P_2O_5$ content is from 0.30 to 0.80 wt %, and the weight ratio of $P_2O_5/B_2O_3$ is from 0.3 to 1.0.

17. The refractory according to claim 12, wherein the $Al_2O_3$ content is from 50 to 70 wt %, and the $ZrO_2$ content is from 20 to 38 wt %.

18. The refractory according to claim 12, wherein the $ZrO_2$ content is from 35 to 59 wt %, and the $Al_2O_3$ content is from 30 to 53 wt %.

19. A glass melting furnace employing the refractory as defined in claim 12.

20. A glass melting furnace employing the refractory as defined in claim 17 at a portion not contacting molten glass.

21. A glass melting furnace employing the refractory as defined in claim 18 as a refractory for a portion not contacting molten glass.

22. A method of making a fused-cast-alumina-zirconia-silica refractory, the method comprising casting a melt including alumina, zirconia and silica; and forming the fused-cast-alumina-zirconia-silica refractory of claim 12.

23. A fused-cast-alumina-zirconia-silica refractory consisting essentially of corundum crystals, baddeleyite crystals and a matrix glass phase and having a chemical composition comprising (a) from 30 to 70 wt % of $Al_2O_3$, (b) from 20 to 59 wt % of $ZrO_2$, (c) from 5 to 12 wt % of $SiO_2$, (d) from 0.15 to 0.60 wt % of $Na_2O$, (e) from 0 to 0.50 wt % of $K_2O$, (f) from 0.05 to 0.80 wt % of $B_2O_3$, (g) from 0.05 to 0.80 wt % of $P_2O_5$, and (h) from 0.05 to 0.50 wt % of $SnO_2$.

24. The refractory according to claim 23, wherein the $SiO_2$ content is from 7 to 10 wt %, and the weight ratio of $SiO_2/(Na_2O+0.66\ K_2O)$ is from 20 to 30.

25. The refractory according to claim 23, wherein the total of the $B_2O_3$ content and the $P_2O_5$ content is from 0.30 to 0.80 wt %, and the weight ratio of $P_2O_5/B_2O_3$ is from 0.3 to 1.0.

26. The refractory according to claim 23, wherein the $Al_2O_3$ content is from 50 to 70 wt %, and the $ZrO_2$ content is from 20 to 38 wt %.

27. The refractory according to claim 23, wherein the $ZrO_2$ content is from 35 to 59 wt %, and the $Al_2O_3$ content is from 30 to 53 wt %.

28. A glass melting furnace employing the refractory as defined in claim 23.

29. A glass melting furnace employing the refractory as defined in claim 26 at a portion not contacting molten glass.

30. A glass melting furnace employing the refractory as defined in claim 27 as a refractory for a portion not contacting molten glass.

31. A method of making a fused-cast-alumina-zirconia-silica refractory, this method comprising casting a melt including alumina, zirconia and silica; and forming the fused-cast-alumina-zirconia-silica refractory of claim 23.

* * * * *